(12) United States Patent
Qin

(10) Patent No.: US 11,477,513 B2
(45) Date of Patent: Oct. 18, 2022

(54) SMART CONTROL DEVICE, METHOD FOR IMPLEMENTING SMART CONTROL DEVICE, AND SMART TV

(71) Applicant: SHENZHEN SKYWORTH-RGB ELECTRONIC CO., LTD., Shenzhen (CN)

(72) Inventor: Jilei Qin, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/016,606

(22) Filed: Sep. 10, 2020

(65) Prior Publication Data

US 2020/0413121 A1 Dec. 31, 2020

Related U.S. Application Data

(63) Continuation of application No. PCT/CN2019/094308, filed on Jul. 2, 2019.

(30) Foreign Application Priority Data

Jul. 11, 2018 (CN) .......................... 201810762325.1

(51) Int. Cl.
*H04N 21/422* (2011.01)
*H04N 5/64* (2006.01)
(Continued)

(52) U.S. Cl.
CPC ......... *H04N 21/42221* (2013.01); *H04N 5/63* (2013.01); *H04N 5/64* (2013.01); *H04N 21/42202* (2013.01); *H04N 21/4882* (2013.01)

(58) Field of Classification Search
CPC ...... H04N 21/42221; H04N 5/63; H04N 5/64; H04N 21/42202; H04N 21/4882; H04N 21/41; F16M 11/24
See application file for complete search history.

(56) References Cited

U.S. PATENT DOCUMENTS 5,598,207 A 1/1997 Komnos et al.
10,496,216 B2 * 12/2019 Stone .................... G06F 3/0442
(Continued)

FOREIGN PATENT DOCUMENTS

CN 101605231 A 12/2009
CN 201611922 U 10/2010
(Continued)

OTHER PUBLICATIONS

First Office Action in counterpart Chinese Application No. 201810762325.1, dated Mar. 13, 2020.
(Continued)

*Primary Examiner* — Paulos M Natnael
(74) *Attorney, Agent, or Firm* — Westbridge IP LLC

(57) ABSTRACT

A smart control device is provided. The smart control device and a display panel of a smart TV are separately provided. The smart control device includes: a lifting unit, and a charging unit, and a main control unit including a main control circuit board configured to control the display panel. The lifting unit includes a bearing platform configured to bear a target object, an infrared sensor, and a lifting motor. The main control unit is configured to control an operation of the lifting motor and adjust a position of the bearing platform according to a detection signal of the infrared sensor. The charging unit is configured to charge the target object upon receiving a preset position signal generated in response to a determination that the bearing platform reaches a preset position.

17 Claims, 7 Drawing Sheets

(51) Int. Cl.
*H04N 5/63* (2006.01)
*H04N 21/488* (2011.01)

(56) References Cited

U.S. PATENT DOCUMENTS

| | | | |
|---|---|---|---|
| 2008/0317503 A1* | 12/2008 | Ohnishi | G03G 15/0291 |
| | | | 399/173 |
| 2009/0225239 A1 | 9/2009 | Osada et al. | |
| 2010/0207899 A1* | 8/2010 | Oh | G06F 3/04886 |
| | | | 345/173 |
| 2014/0035516 A1 | 2/2014 | Fratti et al. | |
| 2014/0139455 A1* | 5/2014 | Argiro | A63F 13/02 |
| | | | 345/173 |
| 2014/0297897 A1* | 10/2014 | Halim | G06F 13/409 |
| | | | 710/14 |
| 2015/0029404 A1* | 1/2015 | Lin | H04N 21/42212 |
| | | | 348/734 |
| 2015/0052557 A1* | 2/2015 | Hjelmstedt | H04W 4/50 |
| | | | 725/39 |
| 2015/0314989 A1* | 11/2015 | Bruno | B66B 9/16 |
| | | | 187/254 |
| 2016/0020633 A1 | 1/2016 | Han et al. | |
| 2017/0118520 A1* | 4/2017 | Wu | H04N 21/41265 |
| 2017/0155936 A1 | 6/2017 | Shkedi | |
| 2017/0157491 A1* | 6/2017 | Leech | A63B 69/3658 |
| 2018/0220168 A1* | 8/2018 | Han | H04N 21/47202 |

FOREIGN PATENT DOCUMENTS

| | | |
|---|---|---|
| CN | 104767951 A | 7/2015 |
| CN | 204683016 U | 10/2015 |
| CN | 105872415 A | 8/2016 |
| CN | 106231216 A | 12/2016 |
| CN | 106603945 A | 4/2017 |
| CN | 106941614 A | 7/2017 |
| CN | 107948690 A | 4/2018 |
| CN | 207410940 U | 5/2018 |
| CN | 108924448 A | 11/2018 |
| KR | 101726578 B1 | 4/2017 |

OTHER PUBLICATIONS

International Search Report and Written Opinion in corresponding PCT Application No. PCT/CN2019/094308, dated Sep. 24, 2019.
Second Office Action in counterpart Chinese Application No. 201810762325.1, dated Sep. 1, 2020.
Partial Supplementary European Search Report in counterpart European Patent Application No. 19833442.7, dated Dec. 3, 2021.
Examination Report in counterpart Indian Patent Application No. 202027038917, dated Jun. 20, 2021.

* cited by examiner

SMART CONTROL DEVICE, METHOD FOR IMPLEMENTING SMART CONTROL DEVICE, AND SMART TV

CROSS-REFERENCE TO RELATED APPLICATIONS

This application is a Continuation Application of PCT Application No. PCT/CN2019/094308, filed on Jul. 2, 2019, which claims the priority to Chinese Patent Application No. 201810762325.1, entitled "SMART CONTROL DEVICE, METHOD FOR IMPLEMENTING SMART CONTROL DEVICE, AND SMART TV", filed on Jul. 11, 2018, which is hereby incorporated by reference in its entirety.

TECHNICAL FIELD

The present disclosure relates to the technical field of smart control technology, in particular to a smart control device, a method for implementing a smart control device, and a smart TV.

BACKGROUND

Nowadays, TV manufacturers generally assemble a TV display panel (such as an LCD panel) and a main control circuit board (including a main board, a power board, a logic board, etc.) on the module on the back of the LCD panel, resulting in a thicker TV body. The thicker TV body may easily cause problems such as poor heat dissipation of the TV, hanging wall failing to completely fit the wall, and poor visual effects.

In order to address the above problems, the LCD TV manufacturers have proposed an innovative and cutting-edge design concept: replacing the existing LCD TV with a split smart TV. That is, the TV display panel is separated from other main control circuit board systems, and the TV is divided into two parts: a display panel and a control device that controls the display panel, thereby completely solving the problem of thick TV body. This type of split smart TV has more prominent functions than the existing LCD TV, and has a more beautiful and fashionable appearance, so it has a broad market prospect.

With the gradual realization and production of the split smart TV design concept, the above control device has the problem of single function (only transmit TV video signals and control signals to the display panel). For users, the above-mentioned control device which can not achieve more functions will also affect the user's experience when using such a split smart TV. How to improve the user experience of split smart TV has become the focus of manufacturers.

The above content is only used to assist in understanding the technical solution of the present disclosure, and does not mean that the above content is recognized as prior art.

SUMMARY

The main objective of the present disclosure is to provide a smart control device, a method for implementing a smart control device, and a smart TV, which aims to solve the problem of a single function of the control device of the split smart TV, and enable the control device to realize more functions, thereby improving the user experience.

In order to achieve the above objective, the present disclosure provides a smart control device, including a main control unit, a lifting unit and a charging unit, the main control unit including a main control circuit board configured to control the display panel;

the main control unit connected to the lifting unit and the charging unit;

the lifting unit including a bearing platform configured to bear a target object, an infrared sensor, and a lifting motor; the main control unit is configured to control an operation of the lifting motor and adjust a position of the bearing platform according to a detection signal of the infrared sensor; and the charging unit configured to charge the target object upon receiving a preset position signal generated in response to a determination that the bearing platform reaches a preset position.

In some embodiments, the main control unit is in communication with the lifting unit in a wired or wireless manner; and the main control unit is in communication with the charging unit in a wired or wireless manner.

In some embodiments, a moving direction of the bearing platform is a vertical direction.

In some embodiments, the infrared sensor includes a first infrared sensor and a second infrared sensor;

the first infrared sensor is configured to send a human body infrared signal to the main control unit when a human body is detected;

the second infrared sensor is configured to detect a presence state of the target object and send a presence state signal to the main control unit according to the presence state of the target object;

the main control unit is configured to send an operation control signal to the lifting motor according to the human body infrared signal and/or the presence state signal; and the lifting motor is configured to start and operate according to the operation control signal, thereby lifting the bearing platform to reach the preset position.

In some embodiments, the lifting unit further includes an upper limit switch and a lower limit switch;

the upper limit switch is configured to trigger a first limit signal and send the first limit signal to the main control unit in response to a determination that the target object on the bearing platform reaches a first preset position;

the lower limit switch is configured to trigger a second limit signal and send the second limit signal to the main control unit in response to a determination that the target object on the bearing platform reaches a second preset position; and the main control unit is further configured to send a stop control signal to the lifting motor after the first limit signal or the second limit signal is received, to stop the lifting motor.

In some embodiments, the charging unit includes a power supply coil and an analog-to-digital converter;

the main control unit is further configured to enable the power supply coil to charge the target object after the second limit signal is received, the second limit signal being a preset charging signal;

the analog-to-digital converter is configured to obtain a current value of the charged power supply coil and convert the current value of the power supply coil into a digital signal value; and the main control unit is further configured to control the power supply coil to start charging according to the digital signal value.

In some embodiments, the smart control device further includes a temperature control unit and a smart display unit, the temperature control unit includes a temperature sensor and a fan component;

the temperature sensor is configured to detect temperature data of the main control circuit board;

the main control unit is configured to adjust a rotation speed of the fan component according to the temperature data;

the smart display unit includes a first type indicator light and a second type indicator light;

the main control unit is further configured to control a lighting change state of the first type indicator light according to a pulse signal of the fan component during operation; and configured to control a lighting change state of the second type indicator light according to a preset lighting change rule.

In some embodiments, the main control unit is configured to send preset alarm information to a target display device in communication with the smart control device after the temperature data is greater than a preset temperature threshold, thereby the target display device displays alarm display information corresponding to the preset alarm information.

Besides, in order to achieve the above objective, the present disclosure further provides a method for implementing the smart control device as described above, the method includes the following operations:

controlling an operation of the lifting motor of the smart control device according to the detection signal of the infrared sensor, and adjusting the position of the bearing platform of the smart control device; and charging the target object upon receiving the preset position signal generated in response to a determination that the bearing platform reaches the preset position.

In some embodiments, the infrared sensor includes a first infrared sensor and a second infrared sensor, the operation of "controlling an operation of the lifting motor of the smart control device according to the detection signal of the infrared sensor, and adjusting the position of the bearing platform of the smart control device" includes:

controlling the first infrared sensor to perform human body detection, and receiving a human body infrared signal generated by the first infrared sensor upon detecting the human body;

controlling the second infrared sensor to detect a presence state of the target object, and receiving a presence state signal generated by the second infrared sensor according to the presence state of the target object; and sending an operation control signal to the lifting motor according to the human body infrared signal and/or the presence state signal, to control the lifting motor to start and operate according to the operation control signal, thereby lifting the bearing platform to reach the preset position.

In some embodiments, the lifting motor includes an upper limit switch and a lower limit switch, the upper limit switch is configured to trigger the first limit signal after the target object on the bearing platform reaches a first preset position; and the lower limit switch is configured to trigger the second limit signal after the target object on the bearing platform reaches a second preset position;

after the operation of "controlling an operation of the lifting motor", the method further includes:

sending a stop control signal to the lifting motor after a first limit signal from the upper limit switch or a second limit signal from the lower limit switch is received, to stop the lifting motor.

In some embodiments, both the upper limit switch and the lower limit switch are limiters.

In some embodiments, the charging unit includes a power supply coil and an analog-to-digital converter;

the operation of "charging the target object upon receiving the preset position signal generated in response to a determination that the bearing platform reaches the preset position" includes:

enabling the power supply coil to charge the target object upon the second limit signal is received, the second limit signal being a preset charging signal;

starting the analog-to-digital converter, obtaining a current value of the charged power supply coil and converting the current value of the power supply coil into a digital signal value; and controlling the power supply coil to start charging the target object according to the digital signal value.

In some embodiments, the smart control device further includes a temperature control unit, the temperature control unit includes a temperature sensor and a fan component;

the smart control device further includes a smart display unit, the smart display unit includes a first type indicator light and a second type indicator light;

before the operation of "controlling the operation of the lifting motor of the smart control device according to the detection signal of the infrared sensor", the method further includes:

starting the temperature sensor, obtaining temperature data of the main control circuit board and adjusting a rotation speed of the fan component according to the temperature data; and controlling a lighting change state of the first type indicator light according to a pulse signal of the fan component during operation; and controlling a lighting change state of the second type indicator light according to a preset lighting change rule.

In some embodiments, the temperature sensor is a sensor configured to detect a temperature.

Besides, in order to achieve the above objective, the present disclosure further provides a smart TV, In some embodiments, the smart TV includes a smart control device, part of the smart TV, the smart TV further includes a display panel; the smart control device and the display panel are separately provided, the smart control device is in communication with the display panel in a wired or wireless manner, the smart control device includes:

a main control unit, a lifting unit and a charging unit, the main control unit including a main control circuit board configured to control the display panel;

the main control unit connected to the lifting unit and the charging unit;

the lifting unit including a bearing platform configured to bear a target object, an infrared sensor, and a lifting motor; the main control unit is configured to control an operation of the lifting motor and adjust a position of the bearing platform according to a detection signal of the infrared sensor; and the charging unit configured to charge the target object upon receiving a preset position signal generated in response to a determination that the bearing platform reaches a preset position.

In some embodiments, the infrared sensor includes a first infrared sensor and a second infrared sensor;

the first infrared sensor is configured to send a human body infrared signal to the main control unit when a human body is detected;

the second infrared sensor is configured to detect a presence state of the target object and send a presence state signal to the main control unit according to the presence state of the target object;

the main control unit is configured to send an operation control signal to the lifting motor according to the human body infrared signal and/or the presence state signal; and the lifting motor is configured to start and operate according to the operation control signal, thereby lifting the bearing platform to reach the preset position.

In some embodiments, the lifting unit further includes an upper limit switch and a lower limit switch;

the upper limit switch is configured to trigger a first limit signal and send the first limit signal to the main control unit in response to a determination that the target object on the bearing platform reaches a first preset position;

the lower limit switch is configured to trigger a second limit signal and send the second limit signal to the main control unit in response to a determination that the target object on the bearing platform reaches a second preset position; and the main control unit is further configured to send a stop control signal to the lifting motor after the first limit signal or the second limit signal is received, to stop the lifting motor.

In some embodiments, the charging unit includes a power supply coil and an analog-to-digital converter;

the main control unit is further configured to enable the power supply coil to charge the target object after the second limit signal is received, the second limit signal being a preset charging signal;

the analog-to-digital converter is configured to obtain a current value of the charged power supply coil and convert the current value of the power supply coil into a digital signal value; and the main control unit is further configured to control the power supply coil to start charging according to the digital signal value.

In some embodiments, the smart control device further includes a temperature control unit and a smart display unit, the temperature control unit includes a temperature sensor and a fan component;

the temperature sensor is configured to detect temperature data of the main control circuit board;

the main control unit is configured to adjust a rotation speed of the fan component according to the temperature data;

the smart display unit includes a first type indicator light and a second type indicator light;

the main control unit is further configured to control a lighting change state of the first type indicator light according to a pulse signal of the fan component during operation; and configured to control a lighting change state of the second type indicator light according to a preset lighting change rule.

The present disclosure provides a smart control device, a method for implementing a smart control device, and a smart TV. When the user wants to take the target object, the target object is automatically raised and provided to the user by controlling the lifting of the target object (such as the remote control) through controlling the bearing platform. When the target object is put back on the bearing platform, it will automatically drop to the bottom to be charged. The built-in smart temperature control unit controls the temperature rise around the main control circuit board in real time, so that the hardware can run in a reliable and good temperature rise environment. In addition, a smart display unit with LED marquee and LOGO breathing light effect is also integrated, which make users understand the current operating state of the system, and provides users with a sense of technology, innovative use experience and perception experience, thereby enriching the functions of the control device of the split smart TV, satisfying the user's needs for fashion and avant-garde design, and contributing to the landing and popularization of split smart TVs.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, and do not limit the present disclosure.

It should be noted that the smart control device in each embodiment of the present disclosure is part of a smart TV, and the smart TV further includes a display panel. The smart control device and the display panel are separately provided, and the smart control device is in communication with the display panel in a wired or wireless manner. That is, the above-mentioned smart TV actually refers to the "split smart TV" described in the background.

Figure 1:
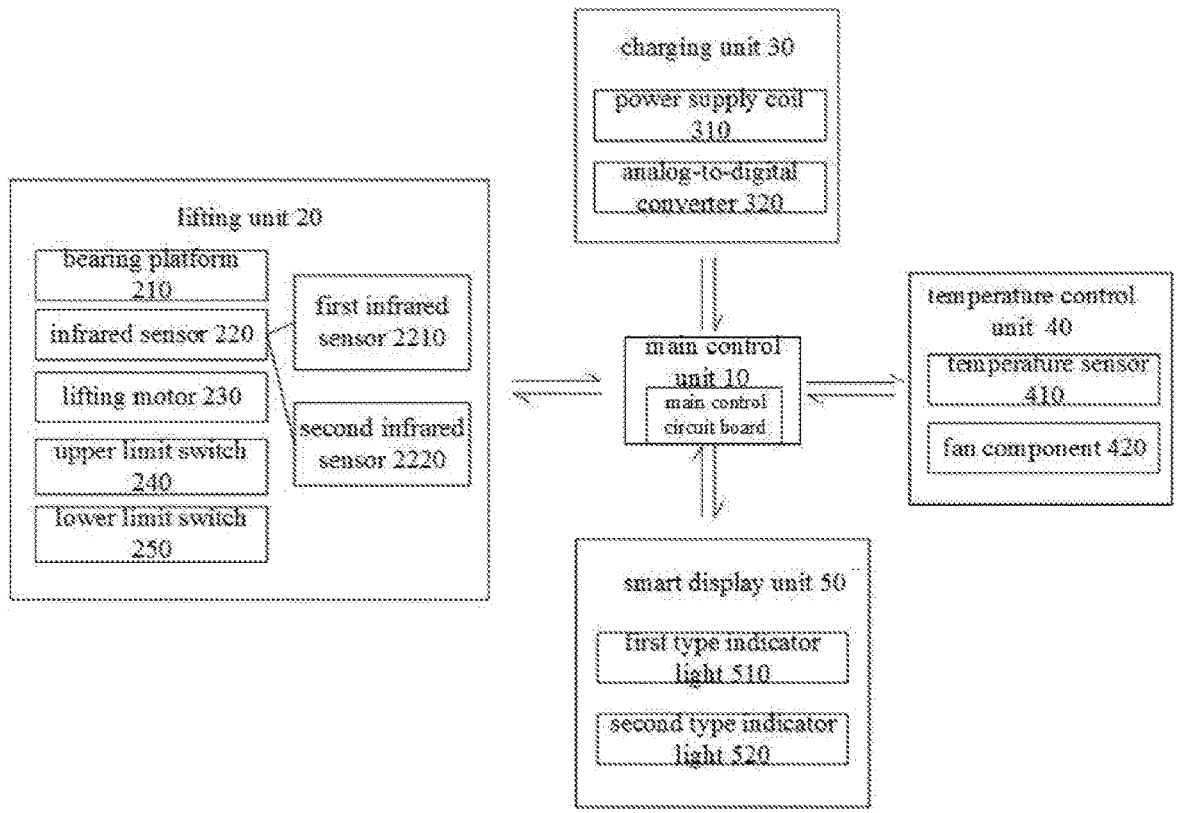
FIG. 1 is a block diagram of the components of a smart control device according to the present disclosure.

As shown in FIG. 1, FIG. 1 is a block diagram of the components of a smart control device according to the present disclosure. The smart control device includes a main control unit 10, a lifting unit 20, and a charging unit 30. The main control unit 10 includes a main control circuit board configured to control a preset display device.

The preset display device refers to a device or setting that has a video/audio playback function or an image/character string (text) display function, such as a display screen or a display. Understandably, the smart control device of the present disclosure realizes the control of the preset display device, specifically through the main control circuit board of the main control unit 10 installed on the device. In an embodiment, the smart control device of the present disclosure and the liquid crystal panel of the smart television jointly constitute a split-type smart television. The main control unit 10 includes a microprocessor (MCU) configured to control each functional module/unit/component. Optionally, the MSP430G2755 microcontroller of Texas Instruments with good performance and strong reliability is used as the microprocessor of the main control unit 10.

The main control unit 10 is in communication with the lifting unit 20 in a wired or wireless manner; and the main control unit 10 is in communication with the charging unit 30 in a wired or wireless manner.

That is, the data is transmitted between the main control unit, the lifting unit and the charging unit through communication.

The lifting unit 20 includes a bearing platform 210 configured to bear a target object, an infrared sensor 220, and a lifting motor 230. The main control unit 10 is configured to control an operation of the lifting motor 230 and adjust a position of the bearing platform 210 according to a detection signal of the infrared sensor 220.

Specially, the bearing platform includes a bearing surface that directly contacts the target object, and a support frame that supports the bearing surface. The bearing surface may specifically be a circular horizontal plane, which helps to improve the compactness of the bearing platform and the fit of the components. The support frame can be connected to the lifting motor through its own connection structure or external connection parts; that is, when the lifting motor runs in different directions, the position of the bearing platform will change accordingly. Optionally, the position movement direction of the bearing platform is a vertical direction, specifically including upward and downward directions. The target object may specifically be a remote control of the TV or other objects, that is, one main purpose of the lifting unit 20 is to store/bear the target object.

The infrared sensor 220 performs infrared signal detection and transmits the detection signal to the main control unit 10. The main control unit 10 sends corresponding control signals (such as upward signals or downward signals) to the lifting motor 230 according to the received detection signals, so that the lifting motor 230 performs different types of rotating actions (such as rotating direction, rotating speed). Therefore, the position of the bearing platform 210 is adjusted accordingly, and the position of the target object placed on the bearing platform 210 also changes accordingly.

In some embodiments, the infrared sensor 220 includes a first infrared sensor 2201 and a second infrared sensor 2202.

The first infrared sensor 2201 is configured to send a human body infrared signal to the main control unit when a human body is detected.

The first infrared sensor 2201 may be disposed near the bearing platform 210 in order to detect the human body infrared signal. For example, the user wants to remove the target object placed on the bearing platform 210 by hand, when the user's hand is close to the bearing platform 210, the first infrared sensor 2201 detects the infrared signal of the hand, it sends a corresponding human body infrared signal to the main control unit.

The second infrared sensor 2202 is configured to detect a presence state of the target object and send a presence state signal to the main control unit according to the presence state of the target object.

The second infrared sensor 2202 includes an infrared transmitter 2202-1 and an infrared receiver 2202-2 that are oppositely arranged, and the number may be one or more. In this embodiment, the number of infrared transmitter and infrared receiver are one and two, respectively.

The presence state 1 of the target object: when the target object is placed on the bearing platform 210, the infrared transmitter 2202-1 and the infrared receiver 2202-2 are separated by the target object, therefore the infrared receiver 2202-2 cannot receive the infrared signal emitted by the infrared transmitter 2202-1.

The presence state 2 of the target object: when the target object is removed, there is no isolated object between the infrared transmitter 2202-1 and the infrared receiver 2202-2, therefore the infrared receiver 2202-2 can receive the infrared signal emitted by the infrared transmitter 2202-1.

In the above two presence states of the target object, the second infrared sensor 2202 generates two presence state signals correspondingly.

The main control unit 10 is configured to send an operation control signal to the lifting motor according to the human body infrared signal and/or the presence state signal.

The lifting motor 230 is started and operated according to the operation control signal, thereby the bearing platform reaches the preset position.

That is, the automatic adjustment of the position of the bearing platform (such as automatic lifting) is realized according to the human body infrared signal detected by different infrared sensors and/or the presence state signal of the target object, such that the bearing platform can automatically reach the preset position, thereby facilitating the user to pick and place the target object and store the target object, which helps to facilitate the user's operation and protect the target object.

Further, as shown in FIG. 1, the lifting unit 20 further includes an upper limit switch 240 and a lower limit switch 250; the upper limit switch 240 is configured to trigger a first limit signal and send the first limit signal to the main control unit 10 after the target object on the bearing platform 210 is configured to reach a first preset position.

The lower limit switch 250 is configured to trigger a second limit signal and send the second limit signal to the main control unit 10 after the target object on the bearing platform 210 is configured to reach a second preset position.

The main control unit 10 is further configured to send a stop control signal to the lifting motor 230 after the first limit signal or the second limit signal is received, to stop the lifting motor 230.

The first preset position and the second preset position respectively refer to two ends of the bearing platform 210, such as the top end and the bottom end. Specially, the upper/lower limit switches are various types of limiters. After the lifting motor 230 stops running, the bearing platform 210 also stops at the first preset position or the second preset position accordingly. In this way, based on the setting of the upper/lower limit switch, it is realized that the bearing platform of the lifting unit automatically stops when it reaches the first preset position or the second preset position. No manual control is required, which simplifies user's operations and helps improve user experience.

The specific implementation of the lifting unit 20 refers to the specific embodiments of the method for implementing the smart control device of the present disclosure below.

The charging unit 30 is configured to charge the target object when receiving a preset position signal after the bearing platform 210 reaches a preset position.

After the bearing platform 210 reaches the preset position, the preset sensor triggers the corresponding preset position signal, and the preset position signal is sent to the main control unit 10. The main control unit 10 sends a charging control signal to the charging unit 30 according to the preset position signal. The charging unit 30 charges the target object. Understandably, the charging unit 30 includes a power supply coil; the target object is an object capable of receiving charging, and specifically includes a charging coil and a storage battery that match the power supply coil. That is, when the charging unit starts charging, the power supply coil works to transfer electric energy to the charging coil of the target object; the battery converts the electric energy received by the charging coil into chemical energy and stores it, thereby realizing the charging of the target object.

Further, as shown in FIG. 1, the charging unit 30 includes a power supply coil 310 and an analog-to-digital converter 320.

The main control unit 10 is further configured to enable the power supply coil 310 to charge the target object after the second limit signal is received, the second limit signal being a preset charging signal.

The second limit signal corresponds to the above trigger signal after the bearing platform 210 reaches the second preset position; the second preset position may specifically be the bottom end reached by the bearing platform 210. That is, when the main control unit 10 receives the second limit signal triggered after the bearing platform reaches the bottom position, the power supply coil is enabled to charge.

The analog-to-digital converter 320 is configured to obtain a current value of the charged power supply coil 310 and convert the current value of the power supply coil 310 into a digital signal value.

The analog-to-digital converter 320, more specifically an A/D analog-to-digital converter, is specifically configured to sample, hold, quantize and encode the current value. Finally, the current value of the power supply coil 310 is converted into a digital signal value.

The main control unit 10 is further configured to control the power supply coil 310 to start charging according to the digital signal value. The specific implementation of the charging process of the charging unit refers to the specific embodiments of the method for implementing the smart control device of the present disclosure below.

Through the control mechanism of the power supply coil and the analog-to-digital converter and the main control unit in the charging unit 30, a control method for enabling and turning on the charging unit to the target object is provided, which helps to ensure the stable and controllable charging process of the target object, and improves the safety of the charging process.

Further, as shown in FIG. 1, the smart control device also includes the specific implementation of the charging process of the charging unit, please refer to the specific embodiments of the method for implementing the smart control device of the present disclosure below.

The temperature control unit 40 includes a temperature sensor 410 and a fan component 420. The temperature sensor 410 is configured to detect temperature data of the main control circuit board; the main control unit 10 is configured to adjust a rotation speed of the fan component 420 according to the temperature data.

The temperature sensor 410 may be various sensors for detecting temperature; the fan component 420 specifically includes a fan blade, a fan motor, and other components. In actual implementation, when the temperature of the main control circuit board is too high, the speed of the fan component 420 will be increased accordingly to enhance the air flow in the area near the main control circuit board, such as increasing the wind speed and increasing the air intake, thereby improving the heat dissipation effect, avoiding the main control circuit board from overheating and damaging, it helps to increase the service life of the main control circuit board and the main control unit, and increase the processing speed of the main control unit.

The specific implementation of the charging unit refers to the specific embodiments of the method for implementing the smart control device of the present disclosure below.

Further, as shown in FIG. 1, the smart control device further includes a smart display unit 50. The smart display unit 50 includes a first type indicator light 510 and a second type indicator light 520.

The main control unit 10 is further configured to control a lighting change state of the first type indicator light 510 according to a pulse signal of the fan component 420 during operation; and configured to control a lighting change state of the second type indicator light 520 according to a preset lighting change rule.

The first type indicator light 510 particularly refers to a Logo breathing light that can be configured to highlight brand trademarks/logos; the second type indicator light 520 particularly refers to a marquee light that can be configured to highlight dynamic changes of light. Both the first type indicator light 510 and the second type indicator light 520 preferably adopt LED lights.

The specific implementation of the smart display unit refers to the specific embodiments of the method for implementing the smart control device of the present disclosure below.

Figure 2:
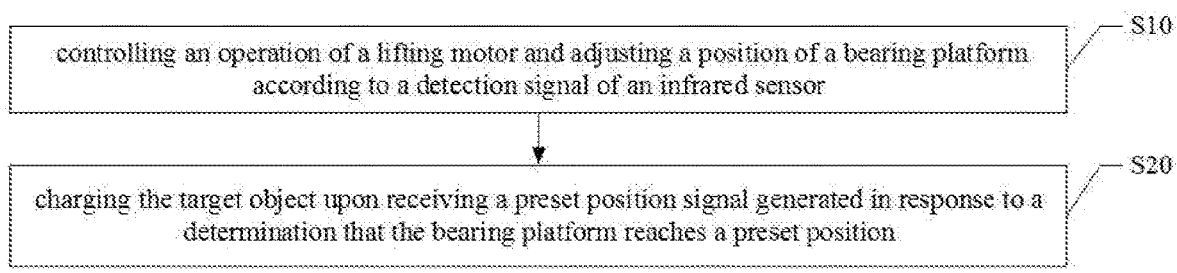
FIG. 2 is a flowchart of a method for implementing a smart control device according to a first embodiment of the present disclosure.

As shown in FIG. 2, FIG. 2 is a first embodiment of the method for implementing the smart control device of the present disclosure, which should be configured as the smart control device described above. In this embodiment, the method includes the following operations:

Operation S10, controlling an operation of a lifting motor of the smart control device according to a detection signal of an infrared sensor, and adjusting a position of a bearing platform of the smart control device.

The infrared sensor detects infrared signals and transmits the detection signals to the main control unit. The main control unit sends the corresponding control signal (such as the up signal or the down signal) to the lifting motor according to the received detection signal. The lifting motor is made to perform different types of rotation actions (such as rotation direction, rotation speed), so that the position of the bearing platform is adjusted correspondingly, and the position of the target object placed on the bearing platform also changes accordingly.

In some embodiments, the infrared sensor includes a first infrared sensor and a second infrared sensor, the operation of "controlling an operation of a lifting motor of the smart control device according to a detection signal of an infrared sensor, and adjusting a position of a bearing platform of the smart control device" includes:

Operation S11, controlling the first infrared sensor to perform human body detection, thereby the first infrared sensor is configured to send a human body infrared signal when detecting the human body;

Operation S12, controlling the second infrared sensor to detect a presence state of the target object, thereby the second infrared sensor is configured to send a presence state signal according to the presence state of the target object; and Operation S13, sending an operation control signal to the lifting motor according to the human body infrared signal and/or the presence state signal.

The lifting motor is configured to start and operate according to the operation control signal, thereby lifting the bearing platform to reach the preset position.

Further, the lifting motor includes an upper limit switch and a lower limit switch, after the operation of "controlling an operation of a lifting motor", the method further includes:

Operation S14, sending a stop control signal to the lifting motor after a first limit signal or a second limit signal is received, to stop the lifting motor.

The upper limit switch is configured to trigger the first limit signal after the target object on the bearing platform reaches a first preset position; the lower limit switch is configured to trigger the second limit signal after the target object on the bearing platform reaches a second preset position.

Figure 3:
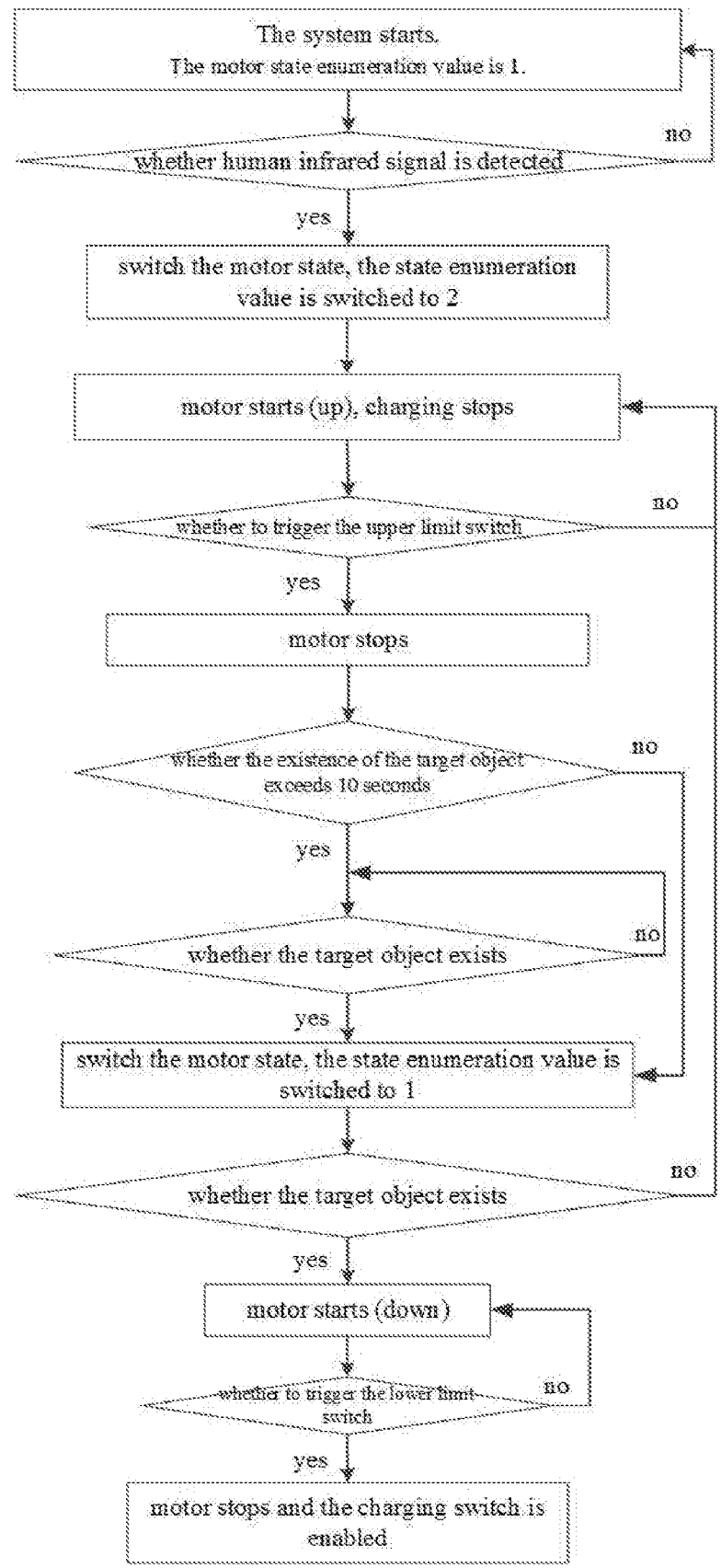
FIG. 3 is an exemplary implementation flowchart of a lifting unit of the smart control device according to the present disclosure.

The above operations are the implementation operations of the lifting unit 20 of the smart control device of the present disclosure. Hereinafter, an example will be described with reference to the flowchart shown in FIG. 3.

In a specific embodiment, the control program of the lifting unit 20 includes four enumeration settings for controlling the driving of the lifting motor 220, and the mapping relationship between the names of the enumerations and the meanings is shown in Table 1.

TABLE 1 the relationship between the names of lifting motor drive state enumeration and the meanings Motor state enumeration

| Name of the enumeration | Enumeration value | Motor running state | Bearing platform state |
|---|---|---|---|
| SKY_MOTOR_STATE_NORMAL | 1 | The motor descends or descends to the bottom and stops | The bearing platform is down or at the bottom |
| SKY_MOTOR_STATE_UP | 2 | The motor moves up or up to the top and stops | The bearing platform is up or on the top |
| SKY_MOTOR_STATE_EXCEPTION | 3 | Motor running abnormally | The bearing platform is in an abnormal state |
| SKY_MOTOR_STATE_ERROR | 4 | Motor running error | The bearing platform is in an error state |

First, the control program of the lifting unit defaults that: the target object (such as the remote control) is placed on the bearing platform, and both the target object and the bearing platform are located at the bottom. When the lifting motor is in the SKY_MOTOR_STATE_NORMAL state (enumeration value is 1), the target object is in the charging state.

When the user puts the hands or other parts of the body close to the bearing platform, the first infrared sensor (such as the human infrared receiver) can receive the human body infrared signal, the first infrared sensor sends the human body infrared signal to the main control unit (Note: the human body infrared receiving head is preferably hidden in the bottom structure of the bearing platform. Understandably, after the related structure and hardware are debugged, the first infrared sensor can be protected from the interference of ordinary incandescent lamps, LED lamps, op lamps, etc. There is no need to perform signal anti-interference processing through software, which helps to save memory processing resources and improve the sensitivity and accuracy of the first infrared sensor). Correspondingly, the main control unit sends the corresponding upward control signal to the lifting motor, so that the state of the lifting motor is switched to the SKY_MOTOR_STATE_UP state (the enumeration value is 2); the bearing platform rises, and incidentally, the carried target object is raised. At this time, the power supply coil of the charging unit is turned off, and the charging process of the target object is terminated.

When the target object rises to the first preset position, the upper limit switch is triggered; the upper limit switch triggers the first limit signal to the main control unit; the main control unit then sends a stop control signal to the lifting motor to stop the lifting motor. The user can extract the target object on the raised platform. For example, when the target object is a TV remote control, the user picks up the TV remote control to perform remote control operations on the TV. At this time, the bearing platform will remain on the top.

In another situation, when the user extracts the target object from the bearing platform, the bearing platform will also remain on the top. If the target object is not taken away by the user, the second infrared sensor (specifically including an infrared transmitter and an infrared receiver) detects the presence state of the target object. If the target object is still placed on the bearing platform within a preset time (such as 10 seconds), the second infrared sensor sends a corresponding presence state signal to the main control unit, automatically starts the lifting motor, and lowers the bearing platform. The target object is dropped to the second preset position (such as the bottom) together with the bearing platform. The lower limit switch is triggered to send a second limit signal to the main control unit; the main control unit sends a stop control signal to the lifting motor to stop the lifting motor. Then continue to charge the target object, and the state of the lifting motor switches to SKY_MOTOR_STATE_NORMAL (the enumeration value is 1).

It should be noted that when the bearing platform is kept on the top and the user takes the target object and puts it back on the bearing platform, the target object blocks the signal transmission between the second infrared sensor (infrared transmitter and infrared receiver) on the top of the platform. If the bearing platform does not descend to the bottom and the lower limit switch is still not triggered, the state of the lifting motor during the downward process is switched to SKY_MOTOR_STATE_NORMAL (the enumeration value is 1). In extreme cases, when the bearing platform is in the downward process, or the bearing platform is at the bottom, the state of the lifting motor is SKY_MOTOR_STATE_NORMAL (the enumeration value is 1). If the user suddenly removes the target object, the signal transmission between the infrared transmitter and the infrared receiver on the top of the bearing platform will be restored, then the lifting motor turns or starts to move the bearing platform upwards until the bearing platform reaches the top, the upper limit switch is triggered, and the lifting motor stops running, the target object is waited to be returned to the bearing platform; the state of the motor is still SKY_MOTOR_STATE_NORMAL (the enumeration value is 1).

The technical effects of the lifting unit are: according to the human body infrared signal detected by different infrared sensors and/or the presence state signal of the target object, the automatic adjustment of the position of the bearing platform (such as automatic lifting) is realized, such that the bearing platform can automatically reach the preset position, thereby facilitating the user to pick and place the target object and store the target object, which helps to facilitate the user's operation and protect the target object. At the same time, the target object is intelligently charged to prevent the target object from being unable to be used normally because it has not been charged for a long time. In this way, it is possible to provide users with a more comfortable, more technological and innovative experience.

Operation S20, charging a target object upon receiving a preset position signal triggered after the bearing platform reaches a preset position.

Specially, the charging unit includes a power supply coil and an analog-to-digital converter.

The operation of "charging a target object upon receiving a preset position signal triggered after the bearing platform reaches a preset position" includes:

Operation S21, enabling the power supply coil to charge the target object after the second limit signal is received, the second limit signal being a preset charging signal;

Operation S22, starting the analog-to-digital converter, obtaining a current value of the charged power supply coil and converting the current value of the power supply coil into a digital signal value; and Operation S23, controlling the power supply coil to start charging according to the digital signal value.

Figure 4:
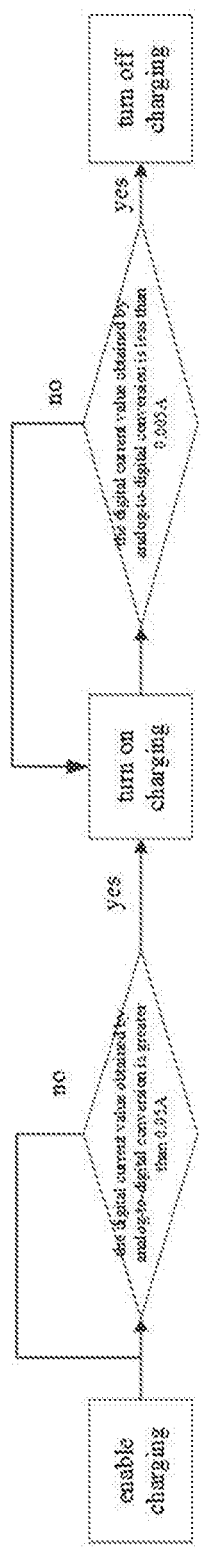
FIG. 4 is an exemplary implementation flowchart of a charging unit of the smart control device according to the present disclosure.

Hereinafter, an example will be described with reference to the preferred implementation flowchart of the charging unit shown in FIG. 4.

As described above, when the target object is placed on the bearing platform and the target object drops to a certain position at the bottom (i.e., the second preset position), the lower limit switch is triggered, and at this time, the power supply coil is enabled. It is understandable that the target object (such as a remote controller) in this embodiment has a receiving coil that receives energy emitted from the power supply coil. Wireless charging can refer to the use of electromagnetic induction principles to achieve energy transfer through coils. Specially, the induced voltage is generated by the changing magnetic field inside the power supply coil, and the energy is emitted, and the receiving coil of the target object receives the energy emitted by the power supply coil and the energy is converted into coupling energy, which is stored in the battery of the target object in the form of chemical energy, thereby completing the charging process.

During the charging process, the analog-to-digital converter converts the current value of the power supply coil to obtain the corresponding digital signal value. The main control unit reads the digital signal value and compares the digital signal value with the charging threshold to determine whether to stop charging. Optionally, as shown in FIG. 4, the power supply specification of the power supply coil is 5V-1A; when the charging current is greater than 5% of the rated current (that is, the A/D conversion current value is greater than 0.05 A), the charging is started. In the charging state, if the charging current is less than 0.5% of the rated current (that is, the A/D conversion current value is less than 0.005 A), it is determined that the target object is close to fully charged, and the charging unit is turned off.

Therefore, according to the actual charging current value of the target object, it can intelligently control whether to charge the target object, and realize the intelligent and precise control of the charging of the target object, which overcomes the problem that the prior art can only directly continuously charge the target object and easily damage the battery of the target object, thereby helping to increase the service life of the target object.

Further, the smart control device further includes a temperature control unit, the temperature control unit includes a temperature sensor and a fan component; before the operation of "controlling an operation of a lifting motor of the smart control device according to a detection signal of an infrared sensor", the method further includes:

Operation S30, starting the temperature sensor, and obtaining temperature data of the main control circuit board; and Operation S31, adjusting a rotation speed of the fan component according to the temperature data.

For example, after the smart control device of the present disclosure starts operation, the temperature control unit is started to detect the temperature of the main control circuit board in real time, and control the speed of the fan components to prevent the main control circuit board from overheating, thereby protecting the main control circuit board.

Figure 5:
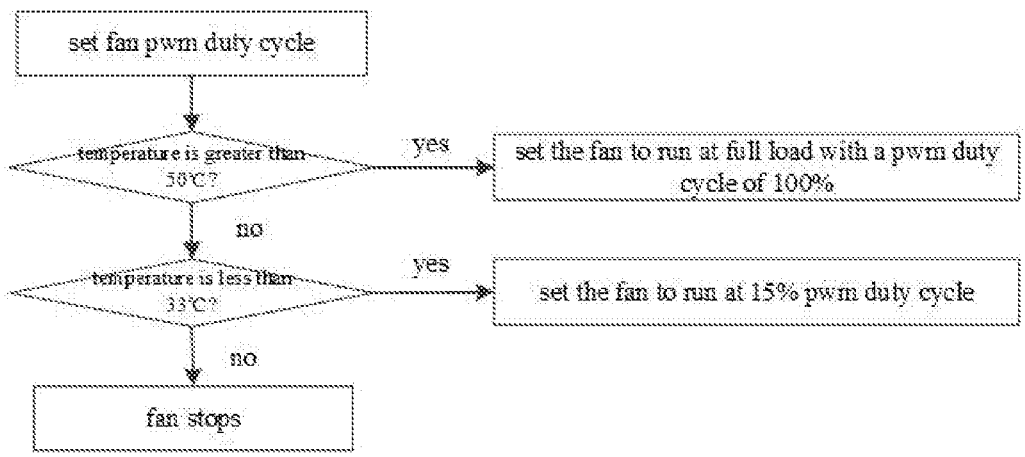
FIG. 5 is a flowchart of a program for controlling a temperature of a main control circuit board and a fan PWM of a temperature control unit of the smart control device according to the present disclosure.

An example will be given with reference to the preferred implementation flowchart of the temperature control unit shown in FIG. 5 below.

The fan in this embodiment adopts a PWM (Pulse Width Modulation) fan that can control the temperature and automatically adjust the fan speed according to the temperature.

Figure 6:
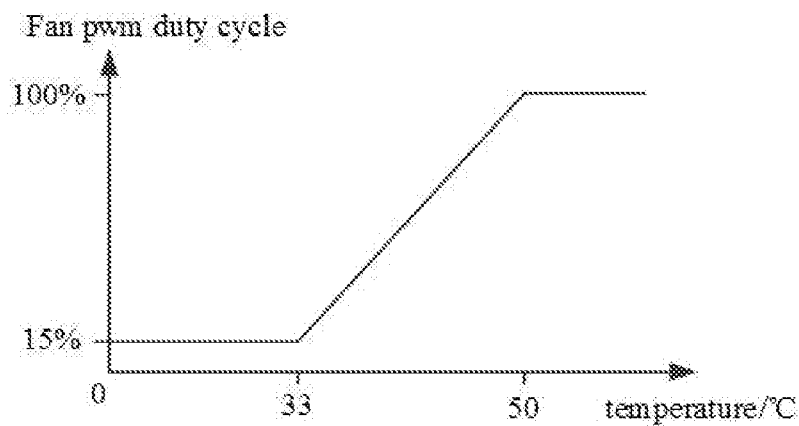
FIG. 6 is a mathematical model diagram corresponding to the flowchart in FIG. 5.
Figure 7:
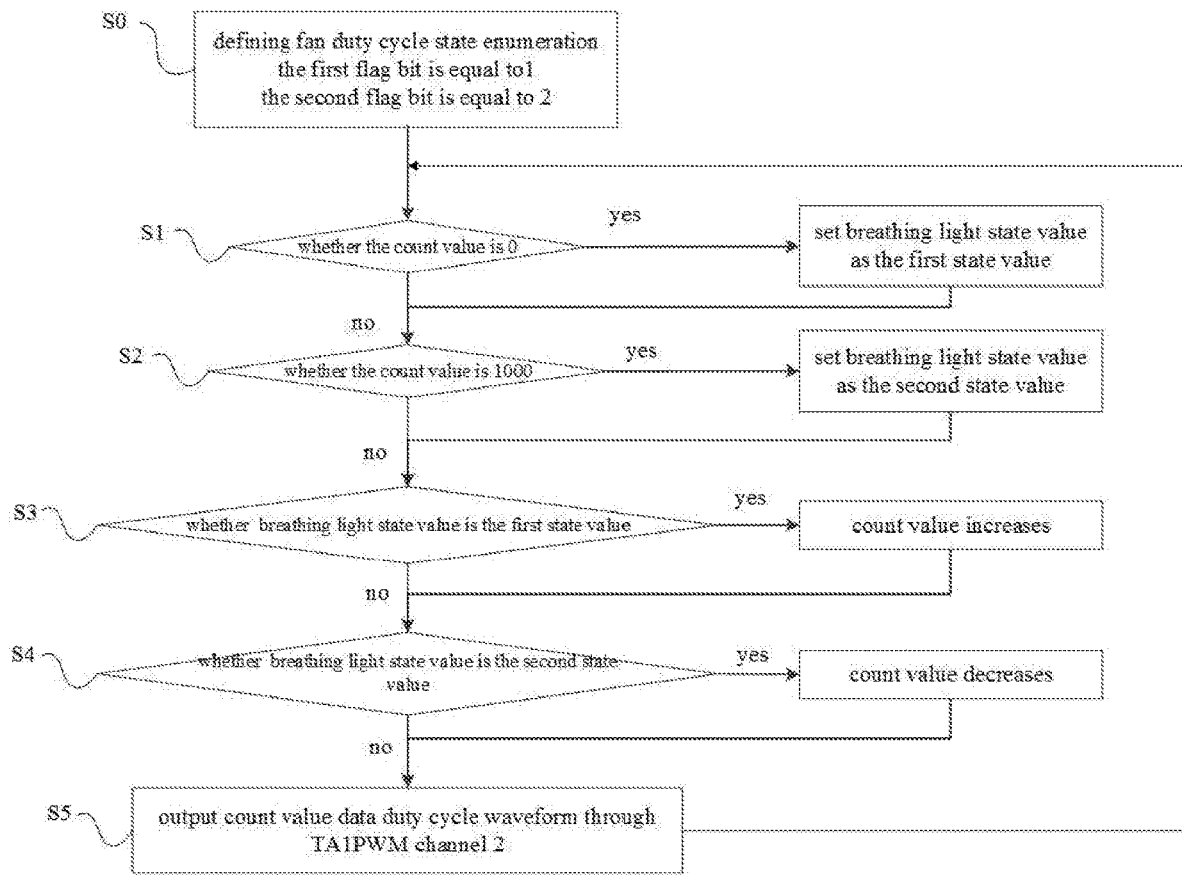
FIG. 7 is an exemplary implementation flowchart of a breathing lamp of the smart display unit of the smart control device according to the present disclosure.

In particular, the current temperature data is transmitted to the main control circuit board through the Uart protocol (Universal Asynchronous Receiver/Transmitter); and the fan speed is calculated and adjusted according to the current temperature data. The fan speed is calculated based on a duty cycle of fan PWM pulse signals. In this embodiment, a flowchart of a program for controlling a temperature of the main control circuit board and the fan PWM of the temperature control unit of the smart control device and the corresponding data model diagrams are shown in FIGS. 5 and 6.

Further, the main control unit is configured to determine whether the temperature data is greater than a preset temperature threshold; if so, sending preset alarm information to the target display device in communication with the smart control device, so that the target display device displays the alarm display information corresponding to the preset alarm information.

In a specific embodiment, in order to ensure the safety and reliability of operation of hardware equipment, when the temperature of the main control circuit board exceeds a preset temperature threshold (such as 50° C.), a preset alarm message is sent to the target display device. The corresponding code can be: UART_SendString (The temperature of the main control circuit board is too high, please check it in time). The preset alarm information will be transmitted to the smart TV through the Uart protocol and displayed on the TV screen. In this way, it is convenient for the user to view the high temperature alarm information of the temperature of the main control circuit board and perform maintenance in time.

The temperature of the main control circuit board of the smart control device will be at a higher value during operation. The main control circuit board needs to be dissipated in time to maintain and improve the operating performance of the main control circuit board. The temperature control unit in this embodiment queries the current temperature in real time, and then uses the temperature control algorithm to output different fan speed control commands to the fans. The fan is made to conduct corresponding diversion and heat dissipation intensity to the main control circuit board according to the corresponding speed, forming a closed-loop temperature control process, avoiding the main control circuit board from overheating, and achieving the effect of temperature limit protection.

Further, the smart control device further includes a smart display unit, the smart display unit comprises a first type indicator light and a second type indicator light. After the operation of "adjusting a rotation speed of the fan component according to the temperature data", the method further includes:

Operation S40, controlling a lighting change state of the first type indicator light according to a pulse signal of the fan component during operation; and Operation S41, controlling a lighting change state of the second type indicator light according to a preset lighting change rule.

Operation S41 does not need to be executed after operation S40, and may be executed before operation S40 or simultaneously with operation S40.

An example will be described with reference to the flowchart of a better implementation of the smart display unit shown in FIGS. 7 to 10.

A realization logic of the first type of indicator light (Logo breathing light) is: pre-designing a Logo breathing light program. For example, the flowchart of the breathing light program implementation shown in FIG. 7 includes the following operations:

Operation S0: defining an enumeration of duty cycle state of a fan. Specially, set a first flag bit corresponding to the duty cycle of 0 (SKY_LOGO_BREATH_DUTY0_FLAG=1), and set a second flag bit corresponding to the duty cycle of 100% (SKY_LOGO_BREATH_DUTY100_FLAG=2). The first flag bit can be configured to control the Logo breathing light to turn off, and the second flag bit can be configured to control the Logo breathing light to turn on. When the first flag bit is transformed to the second flag bit, the Logo breathing light presents a changing process from dark to bright. When the second flag bit is transformed to the first flag bit, the Logo breathing light presents a change process from bright to dark.

Operation S1: determining whether the count value of the logo_breath_count counter is 0; if so, the state value of the breathing light is set as a first state value (corresponding to the first flag bit, that is, eSkyLogoState=SKY_LOGO_BREATH_DUTY0_FLAG).

The count value is automatically incremented (i.e., logo_breath_count++) according to the state value of eSkyLogoState in operation S1; when the count value is accumulated to 1000, operation S2 is executed.

Operation S2: setting the state value of the breathing light as a second state value (corresponding to the second flag bit, that is, eSkyLogoState=SKY_LOGO_BREATH_DUTY100_FLAG).

Figure 8:
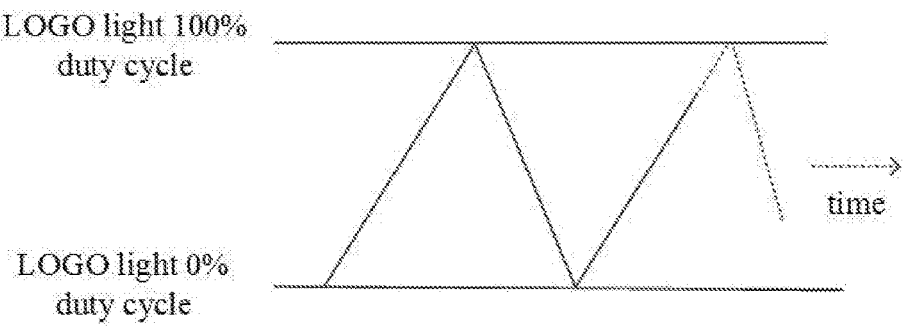
FIG. 8 is a schematic diagram of changes of the triangle wave signal of the breathing lamp in FIG. 7.

The count value is automatically decreased (i.e., logo_breath_count--) according to the state value of eSkyLogoState in operation S2; when the count value is decreased to 0, operation S1 is executed again. In operation S5, the logo_count data duty cycle waveform is output through TA1PWM channel 2, so that the operations S1~S5 are repeatedly executed, and finally a periodic triangular wave signal change as shown in FIG. 8 is formed. The Logo breathing light is based on the periodic triangular wave change signal and presents a light and dark change effect like human breathing.

Figure 9:
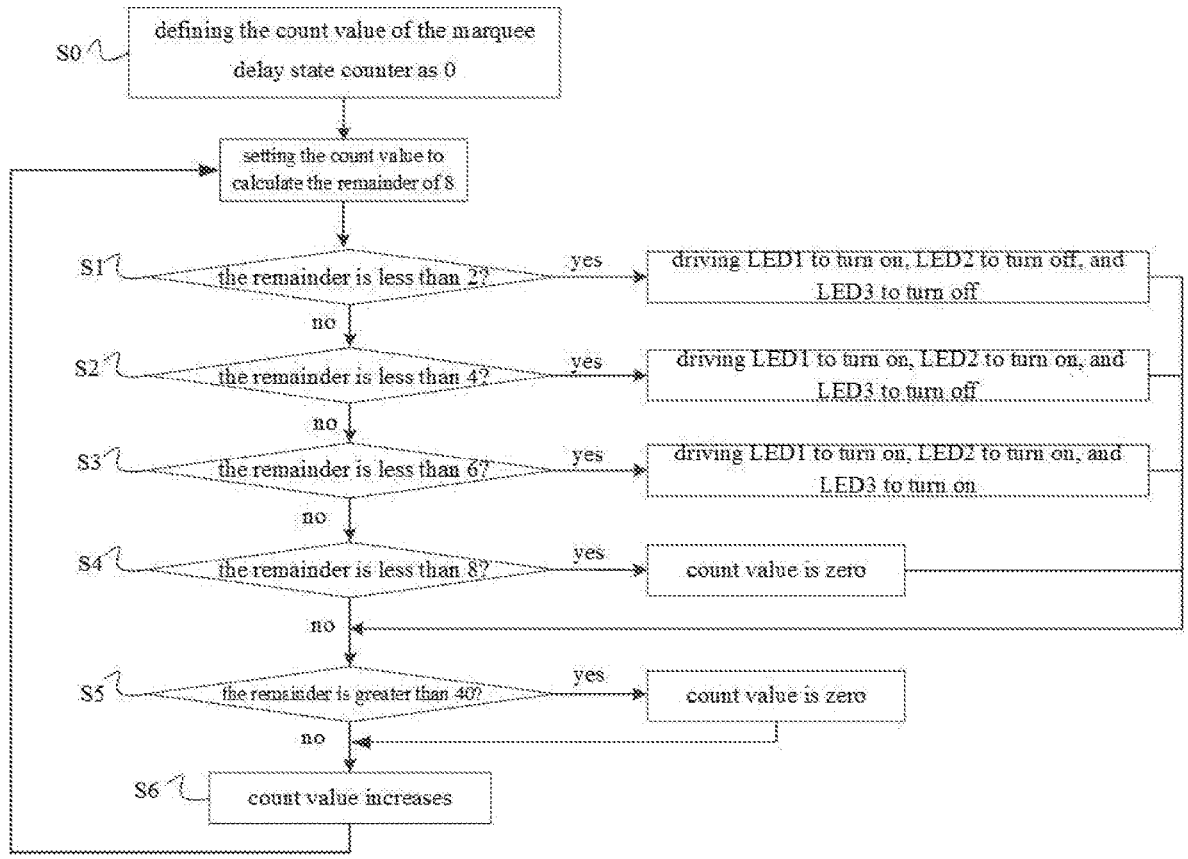
FIG. 9 is an exemplary implementation flowchart of a marquee of the smart display unit of the smart control device according to the present disclosure.

Besides, a realization logic of the second type indicator light (including 3 LED marquees) is: the flowchart for realizing the marquee program shown in FIG. 9, including the following operations:

Operation S0: defining the count value of the marquee delay state counter WORD mLedStateDelay=0;

Operation S1: setting the count value to calculate the remainder of 8; if the remainder is less than 2, driving LED1 to turn on, LED2 to turn off, and LED3 to turn off;

otherwise, perform operation S2: if the remainder result is less than 4, driving LED1 to turn on, LED2 to turn on, and LED3 to turn off;

otherwise, perform operation S3: if the remainder result is less than 6, driving LED1 to turn on, LED2 to turn on, and LED3 to turn on;

otherwise, perform operation S4: if the remainder result is less than 8, driving the LED lamp to maintain the state of operation S3, and setting the count value to zero.

Figure 10:
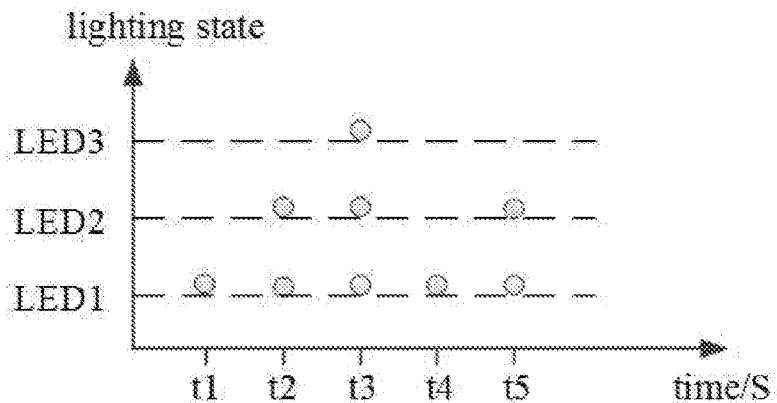
FIG. 10 is a schematic view of lighting states of the marquee in FIG. 9.

For data protection, operation S5 is introduced: when the count value is greater than 40, the count value is set to 0 to ensure that the data will not overflow. The last operation S6 performs an automatic increment operation on the count value data, and repeats the operations S1~56 to make the marquee effect. The corresponding marquee lighting state is shown in FIG. 10.

In other words, the fan speed corresponds to the fan duty cycle, and the current operating state (operating temperature) of the main control circuit board of the main control unit determines the real-time speed of the fan. The light change effect (breathing effect) of the first type indicator light (Logo breathing light) in this embodiment also corresponds to the duty cycle of the fan. Therefore, the first type indicator light in this embodiment can intelligently display the current operating conditions of the main control unit, and send corresponding light prompts to the user. The second type indicator light (marquee) can increase the lighting effect of the marquee. That is, the PWM simulation is used to continuously output the triangular wave to achieve the breathing effect, and the multi-channel IO interface implements the marquee effect according to the flowing marquee control algorithm, which helps to enhance the user's perception experience.

Figure 11:
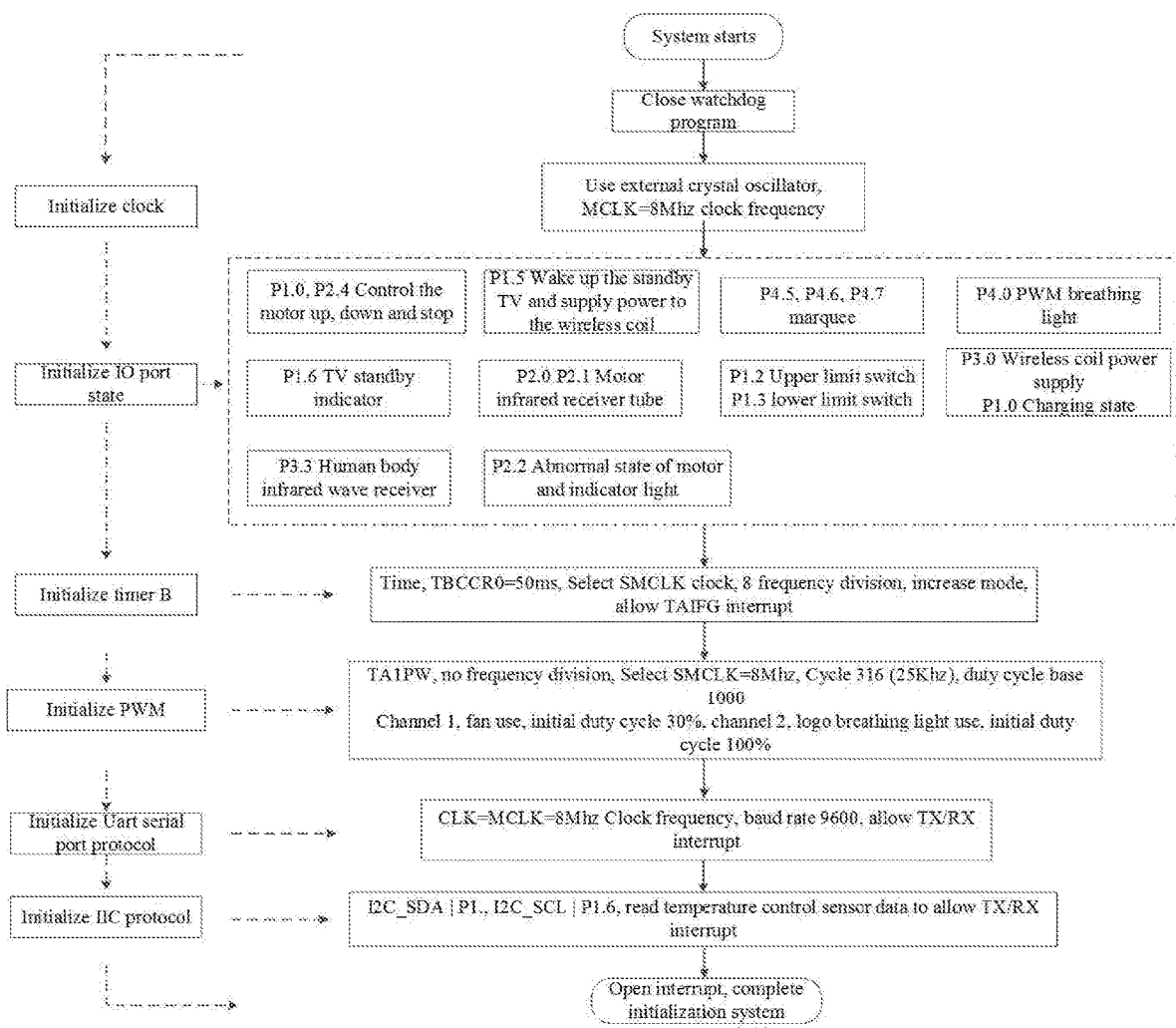
FIG. 11 is a system initialization flowchart of the smart control device according to the present disclosure.

Further, in a specific implementation process, the software system of the smart control device performs the process of what's required in configuring the hardware system, such as the clock and IO port state initialization, timer selection and initialization, Uart serial port protocol initialization, IIC protocol initialization, opening interrupts, and etc. The specific software initialization process flowchart of the hardware system is shown in FIG. 11.

Specially, the clock initialization includes: using an external crystal oscillator and setting the clock frequency MCLK=8 Mhz.

The IO port state initialization includes: motor control (including up, down, stop), TV wake up standby, wireless coil power supply, marquee, PWM breathing light, TV standby indicator, motor infrared receiver tube, upper/lower limit switch, charging state detection, human body infrared wave infrared receiving head, abnormal motor working status and indicator lights.

The timer B initialization includes: setting TBCCR0=50 ms, selecting SMCLK clock, dividing by 8, increasing mode, and allowing TAIFG interrupt.

PWM initialization includes: TA1PWM, no frequency division, setting SMCLK=8 Mhz and duty cycle base to be 1000. PWM channel 1 is for fan components, and the initial duty cycle is 30%; PWM channel 2 is for Logo breathing lights, and the initial duty cycle is 100%.

The Uart serial port protocol initialization includes: setting the clock frequency CLK=MCLK=8 Mhz, setting the baud rate to 9600, and allowing TX/RX interrupts.

The IIC protocol initialization includes I2C_SDA|P1.7, I2C_SCL|P1.6, configured to read temperature control sensor data and allow TX/RX interrupts.

Figure 12:
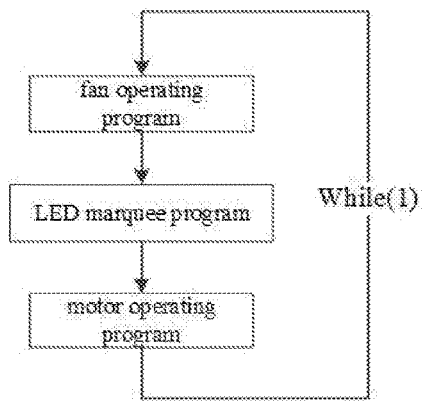
FIG. 12 is a conditional execution flowchart of a functional unit of the smart control device according to the present disclosure.

Further, when executing the above functional units, an infinite while conditional loop thread can be started for smooth and orderly execution including the following main program blocks: the fan running program, LED marquee program, and motor running program as shown in FIG. 12.

In some embodiments of the present disclosure, when the user wants to take the target object, the target object is automatically raised and provided to the user by controlling the lifting of the target object (such as the remote control) through controlling the bearing platform of the smart control device. When the target object is put back on the bearing platform, it will automatically drop to the bottom to be charged. The built-in smart temperature control unit controls the temperature rise around the main control circuit board in real time, so that the hardware can run in a reliable and good temperature rise environment. In addition, a smart display unit with LED marquee and LOGO breathing light effect is also integrated, which make users understand the current operating state of the system, and provides users with a sense of technology, innovative use experience and perception experience, thereby enriching the functions of the control device of the split smart TV, satisfying the user's needs for fashion and avant-garde design, and contributing to the landing and popularization of split smart TVs.

In addition, the present disclosure further provides a smart TV, which includes the above-mentioned smart control device. The smart TV particularly refers to the split smart TV described above.

It should be noted that in this context, the terms "including", "comprising" or any other variations thereof are intended to cover non-exclusive inclusions, therefore a process, method, article, or system that includes a series of elements includes not only those elements, but also other elements that are not explicitly listed, or include elements inherent to the process, method, article, or system. Without more restrictions, the element defined by the sentence "including a . . . " does not exclude the existence of other identical elements in the process, method, article, or system that includes the element.

The serial numbers of the foregoing embodiments of the present disclosure are only for description, and do not represent the superiority of the embodiments.

Through the description of the above embodiments, those skilled in the art can clearly understand that the above-mentioned embodiment method can be implemented by software plus a necessary general hardware platform, and of course can also be implemented by hardware, but in many cases the former is a better implementation. Based on this understanding, the technical solution of the present disclosure essentially or the part that contributes to the existing technology can be embodied in the form of a software product. The computer software product is stored on a storage medium (such as ROM/RAM, magnetic disk, optical disk) as described above, and includes a number of instructions to make a terminal device execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A smart control device, part of a smart TV, the smart TV further comprising a display panel; the smart control device and the display panel being separately provided, the smart control device being in communication with the display panel in a wired or wireless manner, wherein the smart control device comprises:
   a lifting unit comprising:
      a bearing platform configured to bear a target object,
      an infrared sensor, and
      a lifting motor,
   a main control unit, wherein the main control unit is configured to control an operation of the lifting motor and adjust a position of the bearing platform according to a detection signal of the infrared sensor, and the main control unit further comprises:
      a main control circuit board configured to control the display panel; and
   a charging unit configured to charge the target object upon receiving a preset position signal generated in response to a determination that the bearing platform reaches a preset position;
   wherein the infrared sensor comprises a first infrared sensor and a second infrared sensor;
   the first infrared sensor is configured to send a human body infrared signal to the main control unit when a human body is detected;
   the second infrared sensor is configured to detect a presence state of the target object and send a presence state signal to the main control unit according to the presence state of the target object;
   the main control unit is configured to send an operation control signal to the lifting motor according to the human body infrared signal and/or the presence state signal; and
   the lifting motor is configured to start and operate according to the operation control signal, thereby lifting the bearing platform to reach the preset position.

2. The smart control device of claim 1, wherein:
   the main control unit is in communication with the lifting unit in a wired or wireless manner; and
   the main control unit is in communication with the charging unit in a wired or wireless manner.

3. The smart control device of claim 1, wherein a moving direction of the bearing platform is a vertical direction.

4. The smart control device of claim 3, wherein:
   the charging unit comprises a power supply coil and an analog-to-digital converter;
   the main control unit is further configured to enable the power supply coil to charge the target object after the second limit signal is received, the second limit signal being a preset charging signal;

the analog-to-digital converter is configured to obtain a current value of the charged power supply coil and convert the current value of the power supply coil into a digital signal value; and the main control unit is further configured to control the power supply coil to start charging according to the digital signal value.

5. The smart control device of claim 1, wherein:

the lifting unit further comprises an upper limit switch and a lower limit switch;

the upper limit switch is configured to trigger a first limit signal and send the first limit signal to the main control unit in response to a determination that the target object on the bearing platform reaches a first preset position;

the lower limit switch is configured to trigger a second limit signal and send the second limit signal to the main control unit in response to a determination that the target object on the bearing platform reaches a second preset position; and the main control unit is further configured to send a stop control signal to the lifting motor after the first limit signal or the second limit signal is received, to stop the lifting motor.

6. The smart control device of claim 1, wherein:

the smart control device further comprises a temperature control unit and a smart display unit, the temperature control unit comprises a temperature sensor and a fan component;

the temperature sensor is configured to detect temperature data of the main control circuit board;

the main control unit is configured to adjust a rotation speed of the fan component according to the temperature data;

the smart display unit comprises a first type indicator light and a second type indicator light;

the main control unit is further configured to control a lighting change state of the first type indicator light according to a pulse signal of the fan component during operation; and configured to control a lighting change state of the second type indicator light according to a preset lighting change rule.

7. The smart control device of claim 6, wherein the main control unit is configured to send preset alarm information to a target display device in communication with the smart control device after the temperature data is greater than a preset temperature threshold, thereby the target display device displays alarm display information corresponding to the preset alarm information.

8. A method for implementing the smart control device of claim 1, wherein the method comprises the following operations:

controlling an operation of the lifting motor of the smart control device according to the detection signal of the infrared sensor, and adjusting the position of the bearing platform of the smart control device; and charging the target object upon receiving the preset position signal generated in response to a determination that the bearing platform reaches the preset position;

wherein the infrared sensor comprises a first infrared sensor and a second infrared sensor, the operation of controlling an operation of the lifting motor of the smart control device according to the detection signal of the infrared sensor, and adjusting the position of the bearing platform of the smart control device comprises:

controlling the first infrared sensor to perform human body detection, and receiving a human body infrared signal generated by the first infrared sensor upon detecting the human body;

controlling the second infrared sensor to detect a presence state of the target object, and receiving a presence state signal generated by the second infrared sensor according to the presence state of the target object; and sending an operation control signal to the lifting motor according to the human body infrared signal and/or the presence state signal, to control the lifting motor to start and operate according to the operation control signal, thereby lifting the bearing platform to reach the preset position.

9. The method of claim 8, wherein:

the lifting motor comprises an upper limit switch and a lower limit switch, the upper limit switch is configured to trigger the first limit signal after the target object on the bearing platform reaches a first preset position; and the lower limit switch is configured to trigger the second limit signal after the target object on the bearing platform reaches a second preset position;

after the operation of controlling an operation of the lifting motor, the method further comprises:

sending a stop control signal to the lifting motor after a first limit signal from the upper limit switch or a second limit signal from the lower limit switch is received, to stop the lifting motor.

10. The method of claim 9, wherein both the upper limit switch and the lower limit switch are limiters.

11. The method of claim 9, wherein the charging unit comprises a power supply coil and an analog-to-digital converter;

the operation of charging the target object upon receiving the preset position signal generated in response to a determination that the bearing platform reaches the preset position comprises:

enabling the power supply coil to charge the target object upon the second limit signal is received, the second limit signal being a preset charging signal;

starting the analog-to-digital converter, obtaining a current value of the charged power supply coil and converting the current value of the power supply coil into a digital signal value; and controlling the power supply coil to start charging the target object according to the digital signal value.

12. The method of claim 8, wherein:

the smart control device further comprises a temperature control unit, the temperature control unit comprises a temperature sensor and a fan component;

the smart control device further comprises a smart display unit, the smart display unit comprises a first type indicator light and a second type indicator light;

before the operation of controlling the operation of the lifting motor of the smart control device according to the detection signal of the infrared sensor, the method further comprises:

starting the temperature sensor, obtaining temperature data of the main control circuit board and adjusting a rotation speed of the fan component according to the temperature data; and controlling a lighting change state of the first type indicator light according to a pulse signal of the fan component during operation; and controlling a lighting change state of the second type indicator light according to a preset lighting change rule.

13. The method of claim 12, wherein the temperature sensor is a sensor configured to detect a temperature.

14. A smart TV, wherein the smart TV comprises a smart control device, part of the smart TV, the smart TV further comprises a display panel; the smart control device and the display panel are separately provided, the smart control device is in communication with the display panel in a wired or wireless manner, the smart control device comprises:
a lifting unit comprising:
a bearing platform configured to bear a target object, an infrared sensor, and
a lifting motor,
a main control unit, wherein the main control unit is configured to control an operation of the lifting motor and adjust a position of the bearing platform according to a detection signal of the infrared sensor, and the main control unit further comprises:
a main control circuit board configured to control the display panel; and
a charging unit configured to charge the target object upon receiving a preset position signal generated in response to a determination that the bearing platform reaches a preset position;
wherein the infrared sensor comprises a first infrared sensor and a second infrared sensor;
the first infrared sensor is configured to send a human body infrared signal to the main control unit when a human body is detected;
the second infrared sensor is configured to detect a presence state of the target object and send a presence state signal to the main control unit according to the presence state of the target object;
the main control unit is configured to send an operation control signal to the lifting motor according to the human body infrared signal and/or the presence state signal; and
the lifting motor is configured to start and operate according to the operation control signal, thereby lifting the bearing platform to reach the preset position.

15. The smart TV of claim 14, wherein:
the lifting unit further comprises an upper limit switch and a lower limit switch;
the upper limit switch is configured to trigger a first limit signal and send the first limit signal to the main control unit in response to a determination that the target object on the bearing platform reaches a first preset position;
the lower limit switch is configured to trigger a second limit signal and send the second limit signal to the main control unit in response to a determination that the target object on the bearing platform reaches a second preset position; and
the main control unit is further configured to send a stop control signal to the lifting motor after the first limit signal or the second limit signal is received, to stop the lifting motor.

16. The smart TV of claim 15, wherein:
the charging unit comprises a power supply coil and an analog-to-digital converter;
the main control unit is further configured to enable the power supply coil to charge the target object after the second limit signal is received, the second limit signal being a preset charging signal;
the analog-to-digital converter is configured to obtain a current value of the charged power supply coil and convert the current value of the power supply coil into a digital signal value; and
the main control unit is further configured to control the power supply coil to start charging according to the digital signal value.

17. The smart TV of claim 14, wherein:
the smart control device further comprises a temperature control unit and a smart display unit,
the temperature control unit comprises a temperature sensor and a fan component;
the temperature sensor is configured to detect temperature data of the main control circuit board;
the main control unit is configured to adjust a rotation speed of the fan component according to the temperature data;
the smart display unit comprises a first type indicator light and a second type indicator light;
the main control unit is further configured to control a lighting change state of the first type indicator light according to a pulse signal of the fan component during operation; and configured to control a lighting change state of the second type indicator light according to a preset lighting change rule.

* * * * *